HENRY HILL.
Improvement in Mortar Mills.

No. 125,295.                     Patented April 2, 1872.

Witnesses.                          Inventor.
Harry King.                         Henry Hill.
Phil T Dodge.                       by Dodge & Munn.
                                    Att'ys.

UNITED STATES PATENT OFFICE.

HENRY HILL, OF CHICAGO, ILLINOIS.

IMPROVEMENT IN MORTAR-MILLS.

Specification forming part of Letters Patent No. 125,295, dated April 2, 1872.

SPECIFICATION.

*To all whom it may concern:*

Be it known that I, HENRY HILL, of Chicago, in the county of Cook and State of Illinois, have invented certain Improvements in Mortar-Mills, of which the following is a specification, reference being had to the accompanying drawing.

My invention relates to an improved mill for mixing wet mortar, and for pulverizing and mixing, in a dry state, materials to form mortar; and the invention consists in the combination, with traveling crushing-rollers, of scrapers for stirring and mixing the materials, and for delivering or discharging them when their preparation is completed.

Figure 1:
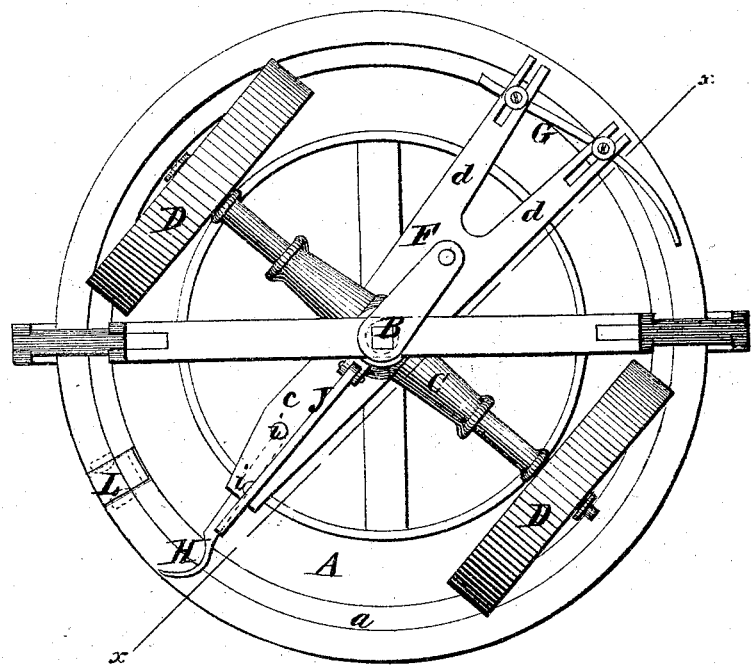
Figure 2:
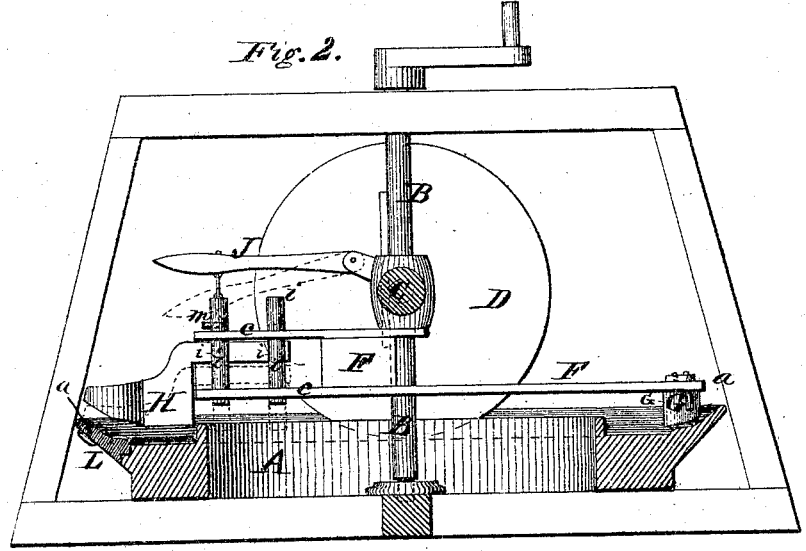

Figure 1 is a top-plan view of my mill, and Fig. 2 a section of the same on the line $x\ x$, Fig. 1.

In the drawing, A A represent a circular trough or bed, in the center of which there is mounted a vertical shaft, B, carrying a horizontal axle, C, on the ends of which there are mounted heavy crushing-rollers, D, which, as the shaft B is revolved, are carried around in the trough A, the axle being connected to the vertical shaft by a spline or feather, so that it permits the rollers to rise and fall. This arrangement of the trough and the crushing-rollers has long been used in oil-mills and quartz-crushers, and therefore constitutes no part of my invention. That portion of the face of the trough or bed A over which the rollers travel is, of course, flat, but the portion around the outer edge is inclined upward, as shown at $a$, Fig. 2, so that as the rollers travel around a portion of the materials will be forced outward onto this inclined face or rim. On the vertical shaft B there is also mounted a horizontal bar or frame, F, connected rigidly to the axle C, so as to move therewith, this bar or frame having two horizontal arms, $c\ c$, at one end and two diverging arms, $d\ d$, at the opposite end. To the slotted arms $d$ there is attached a long scraper, G, which travels around over the outer inclined portion of the bed and scrapes the materials inward, so as to be in the path of the rolls. At the opposite end of the bar or frame, between the arms $c$, there is mounted another scraper, H, for the purpose of discharging the materials after being prepared. This scraper is provided with two rods, $i\ i$, which are mounted, so as to slide in the arms $c$; and one of the rods is connected with the outer end of a hand-lever, J, which is pivoted at its inner end to the axle B, so that by moving the end of the lever the scraper may be raised and lowered. One of the rods $i$ is also provided with a hole to receive a pin, $m$, for holding the scraper up, as shown. One side of the trough or bed is provided with an opening, closed by a removable block, L, as shown in both figures; and it is through this opening that the materials are finally discharged.

In operating the mill, the materials to be mixed are placed on the bed or trough, the scraper H raised and fastened, and the shaft B set in motion. As the rollers travel around they crush and pulverize the materials and mix them together. A portion of the materials being forced outward by the rollers is drawn inward and distributed by the scraper G at each revolution, so that by these repeated operations the different materials are not only pulverized and mixed, but each is distributed evenly, so that the whole forms one homogeneous mass. After the materials have been sufficiently prepared the pin is removed and the scraper H lowered and the plate or block L removed from the bed, when the scraper will discharge the materials through the opening.

My mill may be used for preparing ordinary wet mortar for immediate use, or for grinding the materials together in a dry state, so that they may be stored or shipped for future use, or for grinding or pulverizing old bricks, stones, coarse gravel, &c., for use in mortar or concrete.

Having thus described my invention, what I claim is—

A machine for mixing mortar, consisting of the circular bed A, provided with the removable block L, the traveling-rollers D, and the scrapers G and H, all constructed and arranged to operate substantially as described.

HENRY HILL.

Witnesses:
C. J. CORSE,
FR. W. WOLF.